US012540606B2

(12) United States Patent
Tate

(10) Patent No.: US 12,540,606 B2
(45) Date of Patent: Feb. 3, 2026

(54) FLOATING VARIABLE LEVERAGE PUMP

(71) Applicant: BlueDesal Inc., Sausalito, CA (US)

(72) Inventor: Joseph B. Tate, Sausalito, CA (US)

(73) Assignee: BlueDesal Inc., Sausalito, CA (US)

( * ) Notice: Subject to any disclaimer, the term of this patent is extended or adjusted under 35 U.S.C. 154(b) by 0 days.

(21) Appl. No.: 18/399,072

(22) Filed: Dec. 28, 2023

(65) Prior Publication Data

US 2024/0218862 A1 Jul. 4, 2024

Related U.S. Application Data

(60) Provisional application No. 63/435,951, filed on Dec. 29, 2022.

(51) Int. Cl.
*F04B 17/00* (2006.01)
*F03B 13/22* (2006.01)

(52) U.S. Cl.
CPC .............. *F04B 17/00* (2013.01); *F03B 13/22* (2013.01)

(58) Field of Classification Search
CPC ........ F04B 17/00; F04B 19/027; F04B 19/22; F04B 35/004; F03B 13/14; F03B 13/16; F03B 13/182; F03B 13/1815; F03B 13/187; F03B 13/20; F03B 13/22; Y02E 10/30; F03G 7/08; F05B 2240/93
See application file for complete search history.

(56) References Cited

U.S. PATENT DOCUMENTS

| 4,209,283 A * | 6/1980 | Marbury | F04B 17/00 417/332 |
|---|---|---|---|
| 5,132,550 A | 7/1992 | McCabe | |
| 10,508,640 B2 | 12/2019 | Murtha, Jr. et al. | |
| 2013/0093190 A1 * | 4/2013 | Laz | F03B 15/00 290/53 |
| 2019/0151798 A1 * | 5/2019 | Lafortune | B01D 61/10 |

OTHER PUBLICATIONS

PCT/US2023/086220 International Search Report and Written Opinion mailed Mar. 29, 2024, 16 pages.

* cited by examiner

*Primary Examiner* — Loren C Edwards
(74) *Attorney, Agent, or Firm* — Goodwin Procter LLP

(57) ABSTRACT

Systems and methods for operation and assembly of a floating variable leverage pump are provided. The floating variable leverage pump includes a first floating vessel pivotally coupled to a second floating vessel along an axis. Both the first floating vessel and the second floating vessel are configured to oscillate about the axis. The floating variable leverage pump includes a pump including a first end pivotally coupled to a first fulcrum of the first floating vessel, and a second end pivotally coupled to a second fulcrum of the second floating vessel. The pump is positioned (i) perpendicular to the axis and (ii) in an area between the first floating vessel and the second floating vessel. Displacement of at least one of the first floating vessel or the second floating vessel causes actuation of the pump.

19 Claims, 7 Drawing Sheets

FLOATING VARIABLE LEVERAGE PUMP

CROSS REFERENCE TO RELATED APPLICATIONS

The present application claims the benefit of and priority to U.S. Provisional Application Ser. No. 63/435,951, entitled "FLOATING VARIABLE LEVERAGE PUMP FOR WATER DESALINATION," filed on Dec. 29, 2022, which is hereby incorporated by reference in its entirety.

FIELD OF TECHNOLOGY

The present disclosure relates generally to pump technology and, more specifically, to a floating, wave driven pump configured for desalination.

BACKGROUND

In some cases, a reverse osmosis process can be used to remove salt and/or other impurities (e.g., lead, volatile organic compounds (VOCs), per- and polyfluoroalkyl substances (PFAS), arsenic, bacteria, and viruses) from water to produce potable water that is safe for ingestion. Removal of salt and/or other impurities from water may be referred to herein as "desalination". In some cases, for water to diffuse through a reverse osmosis membrane, the water may be required to be pressurized to a threshold pressure level (e.g., at least 800 pounds per square inch (PSI)). Conventional pump systems used to pressurize water for desalination purposes can require power (e.g., provided by motors and/or engines) to pressurize water to threshold pressure levels, thereby increasing their environmental impact and associated costs of operation. Further, the requirement for an available power source can limit the applications in which conventional pumps can operate. Accordingly, conventional pumps are unable to desalinate water without use of an active power source.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

To address the aforementioned shortcomings, a floating variable leverage pump is provided. Further, systems and methods incorporating the floating variable leverage pump are provided. In one embodiment, the floating variable leverage pump can include a first floating vessel. The floating variable leverage pump also includes a second floating vessel, where the first floating vessel is pivotally coupled to the second floating vessel along an axis, where both the first floating vessel and the second floating vessel are configured to oscillate about the axis. The floating variable leverage pump also includes a pump including a first end pivotally coupled to a first fulcrum of the first floating vessel, and a second end pivotally coupled to a second fulcrum of the second floating vessel. The pump can be positioned (i) perpendicular to the axis and (ii) in an area between the first floating vessel and the second floating vessel. The pump can be configured to desalinate water provided to the pump via actuation of the pump.

The floating variable leverage pump may also include where the first floating vessel is pivotally coupled to the second floating vessel along the axis by one or more coupling mechanisms. The floating variable leverage pump may also include where the first floating vessel and the second floating vessel (i) comprise a buoyant material and (ii) are configured to float on a body of water. The floating variable leverage pump may also include where the first end of the pump includes a piston rod and the second end of the pump includes a pump housing including a first cavity configured to store a fluid (e.g., water), where the piston rod is coupled to the pump housing. Oscillation of the first floating vessel and/or the second floating vessel about the axis can be configured to cause the piston rod to actuate, thereby pressurizing the fluid. The floating variable leverage pump may also include where a distance between the first fulcrum and the second fulcrum is configured to vary (e.g., range) from a minimum distance to a maximum distance based on (i) a position of the first floating vessel about the axis and (ii) a position of the second floating vessel about the axis. The floating variable leverage pump may also include where the first floating vessel includes a first void, where the second floating vessel includes a second void, where the first void and the second void form the area. The floating variable leverage pump may also include where the first floating vessel and/or the second floating vessel includes a control mechanism configured to control a period of oscillation of the floating vessel about the axis.

The floating variable leverage pump may also include an intake fluidically connected to the first cavity and configured to (i) receive the fluid and (ii) provide the fluid to the first cavity based on actuation of the piston rod. The floating variable leverage pump may also include a membrane housing including (i) a second cavity fluidically coupled to the first cavity by a fluid coupling mechanism and (ii) a reverse osmosis membrane, where the second cavity is fluidically coupled to a first side of the reverse osmosis membrane. The membrane housing may further include (i) a first output fluidically coupled to the second cavity and (ii) a second output fluidically coupled to a second side of the reverse osmosis membrane. The floating variable leverage pump may also include where actuation of the piston rod into the pump housing is configured to cause (i) a first portion of the fluid to permeate from the first side of the reverse osmosis membrane through to the second side of the reverse osmosis membrane and (ii) a second portion of the fluid to exit through the first output. The floating variable leverage pump may also include where when the first floating vessel and the second floating vessel have a minimum displacement (e.g., displacement relative to a coplanar position), the distance between the first fulcrum and the second fulcrum is the maximum distance. The floating variable leverage pump may also include where the first floating vessel and the second floating vessel have the minimum displacement when the first floating vessel and the second floating vessel are oriented in a same plane (e.g., are coplanar). The floating variable leverage pump may also include where when the first floating vessel and the second floating vessel have a maximum displacement (e.g., displacement relative to a coplanar position), the distance between the first fulcrum and the second fulcrum is the minimum distance.

The floating variable leverage pump may also include where the control mechanism includes one or more weights, one or more guides configured to retain the one or more weights, and one or more actuators coupled to the one or more weights and configured to control a height of the one or more weights with respect to a top surface of the floating vessel, where the period of oscillation of the floating vessel is based on (e.g., controlled by) the height of the one or more weights. The floating variable leverage pump may also include a computing device. The computing device may include at least one processor configured to perform operations including measuring a wave period of a body of water (e.g., on which the floating variable leverage pump floats) over a period of time, comparing the wave period to the period of oscillation, and causing, based on the comparison, an adjustment to the height of the one or more weights via the one or more actuators. The floating variable leverage pump may also include where the control mechanism is (i) oriented in parallel with the axis and (ii) positioned at a midpoint between a first side of the top surface and a second side of the top surface opposite the first side of the top surface.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1A:
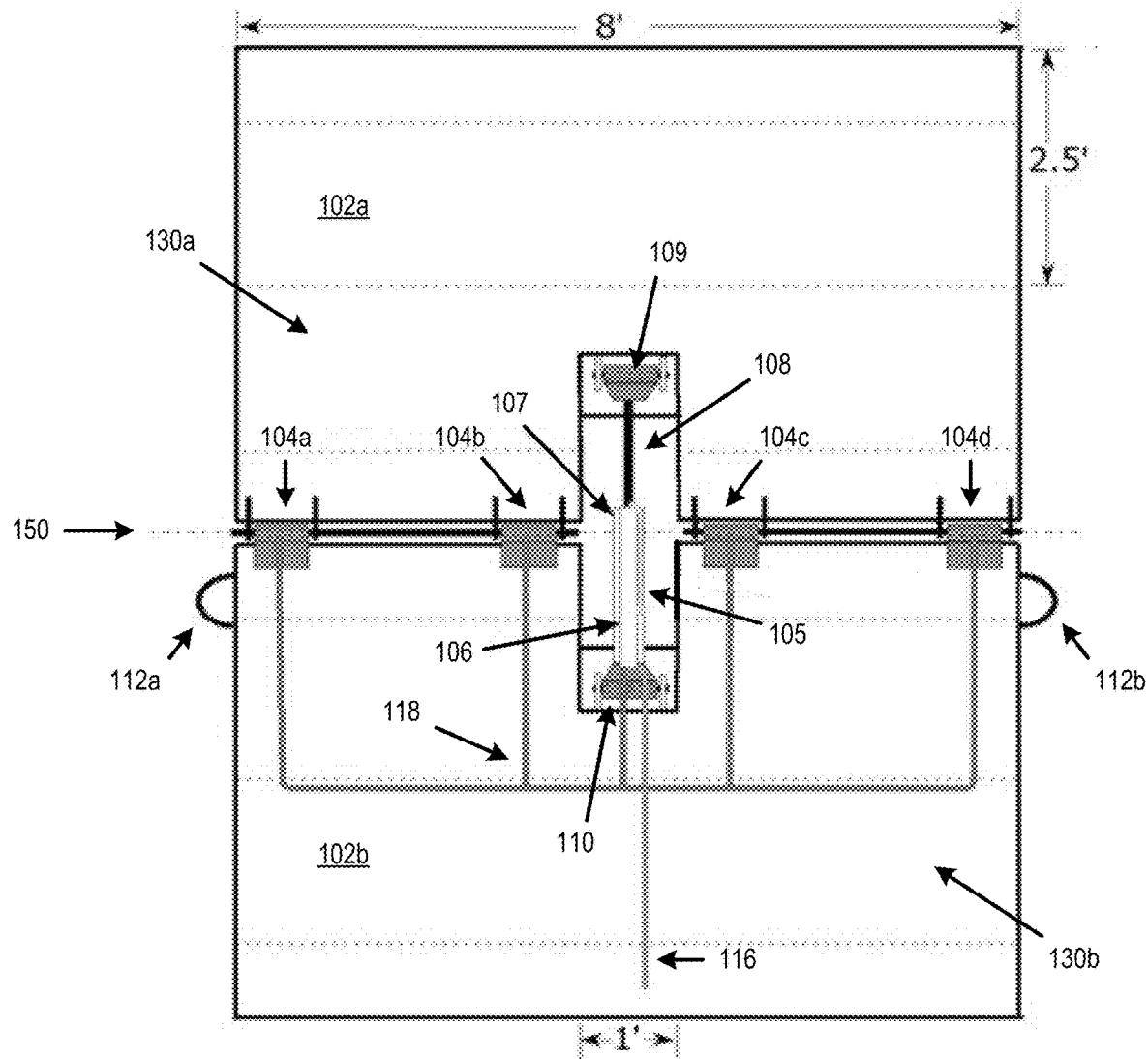
FIG. 1A is a top view of an exemplary floating variable leverage pump, in accordance with some embodiments.

The figures (FIGS.) and the following description relate to some embodiments by way of illustration only. It is to be noted that from the following description, alternative embodiments of the structures and methods disclosed herein will be readily recognized as viable alternatives that may be employed without departing from the principles of the present disclosure.

Reference will now be made in detail to specific embodiments, examples of which are illustrated in the accompanying figures. It is to be noted that wherever practicable, similar or like reference numbers may be used in the figures and may indicate similar or like functionality. The figures depict some embodiments of the disclosed structures or systems (or methods) for purposes of illustration only. One skilled in the art will readily recognize from the following description that alternative embodiments of the structures and methods illustrated herein may be employed without departing from the principles described herein.

Embodiments of a Floating Variable Leverage Pump

As described herein, conventional pumps used for desalination can require connection to active power sources (e.g., motors and/or engines) to desalinate water. Accordingly, these conventional pumps have higher operating costs and environmental impacts (e.g., emissions). Further, these conventional pumps cannot be used in applications and environmental where active power sources are unavailable, thereby limiting their utility to desalinate water from bodies of water.

The present disclosure addresses the aforementioned problems and other problems of existing pumps used for desalination by providing embodiments of a floating variable leverage pump. A floating variable leverage pump may pressurize water based on inertial forces applied to the pump, where (i) a body of water on which the pump floats can apply the inertial forces and (ii) the water can originate from the body of water, such that the pump and body of water form a passive desalination system. As an example, inertial forces from waves, tides, and/or currents can act on the floating variable leverage pump, thereby causing the pump to pressurize water to threshold pressure levels (e.g., pressures exceeding 800 PSI). As described herein, a reverse osmosis process can be used to desalinate and produce potable water via use of a reverse osmosis membrane. Accordingly, a floating variable leverage pump can incorporate a reverse osmosis membrane for desalination purposes.

In some embodiments, a floating variable leverage pump may include one or more floating vessels configured to float on a body of water. For example, a floating variable leverage pump may include a pair of floating vessels that are connected. In some cases, the pair of floating vessels may be rotationally connected by one or more rotational coupling mechanisms (e.g., hinges), where the coupling mechanisms enable each of the floating vessels to move (e.g., rotate and/or oscillate) an axis defined by the one or more coupling mechanisms. Each of the floating vessels may independently oscillate about the axis in an arc based on forces acting on the floating vessels. In some cases, at least one piston pump (e.g., a single action piston pump) may be coupled to each of the floating vessels. The piston pump may be coupled to the floating vessels normal to the axis defined by the one or more coupling mechanisms about which the floating vessels are configured to oscillate.

In some embodiments, the piston pump may include a piston rod and a pump housing, where the piston rod is coupled to the pump housing and the piston rod is configured to actuate into and/out of pump housing. Actuation of the piston rod into the pump housing can be configured to generate and increase a pressure within a membrane housing including a membrane (e.g., reverse osmosis membrane). The membrane housing may be fluidically coupled to the pump housing, such that generating and increasing a pressure within the pump housing may generate and increase a corresponding pressure within the membrane housing. A fulcrum of the piston rod (referred to as a "piston fulcrum") located at a first end of the piston pump may be rotationally coupled to a first floating vessel of the floating vessels and a fulcrum of the pump housing (referred to as a "pump fulcrum") located at a second end of the piston pump may be rotationally coupled to a second floating vessel of the floating vessels. When the floating vessels are coplanar (e.g., such that the top surfaces of the floating vessels are coplanar with respect to each other), the piston pump may be (i) parallel to top surfaces of the pair of floating vessels and (ii) parallel to a surface of a body of water on which the floating variable leverage pump floats of the pair of floating vessels.

Descriptions of the floating vessels as "horizontal", "horizontally positioned", and "coplanar" may refer to a top surface (e.g., deck) of a first floating vessel being coplanar (e.g., in the same plane) with respect to a top surface of a second floating vessel to which the first floating vessel is coupled. Descriptions of "displacement" and "deflection" of the first floating vessel and the second floating vessel may refer to displacement of the floating vessels about an axis of oscillation about which the floating vessels oscillate (e.g., defined by the coupling mechanisms) with respect to the coplanar position. Accordingly, the floating vessels may have a minimum displacement when the floating vessels are coplanar (e.g., as shown in FIG. 1B) and the floating vessels may have a maximum displacement when the floating vessels are maximally displaced inwards (e.g., towards the axis of oscillation) or outwards (e.g., away from the axis of oscillation) relative to the coplanar position. The combination of the connected floating vessels, the piston pump, and membrane housing may form a floating variable leverage pump, where an eccentric distance can refer to a distance between the axis of the coupling mechanisms about which the floating vessels oscillate and each of the pump fulcrum and the piston fulcrum. An eccentric distance between the axis of the coupling mechanisms and each of the pump fulcrum and the piston fulcrum can be measured perpendicular to the axis of the coupling mechanisms. In some cases, a distance between the pump fulcrum and the piston fulcrum can vary based on the displacement of the floating vessels relative to a coplanar position. Variation of the distance between the pump fulcrum and the piston fulcrum can cause the pump housing of the piston pump to fill with water (e.g., via an intake) and pump the water (e.g., seawater) to the membrane housing and through a membrane (e.g., reverse osmosis membrane) included in the membrane housing, thereby filtering the pumped water via reverse osmosis.

Figure 1B:
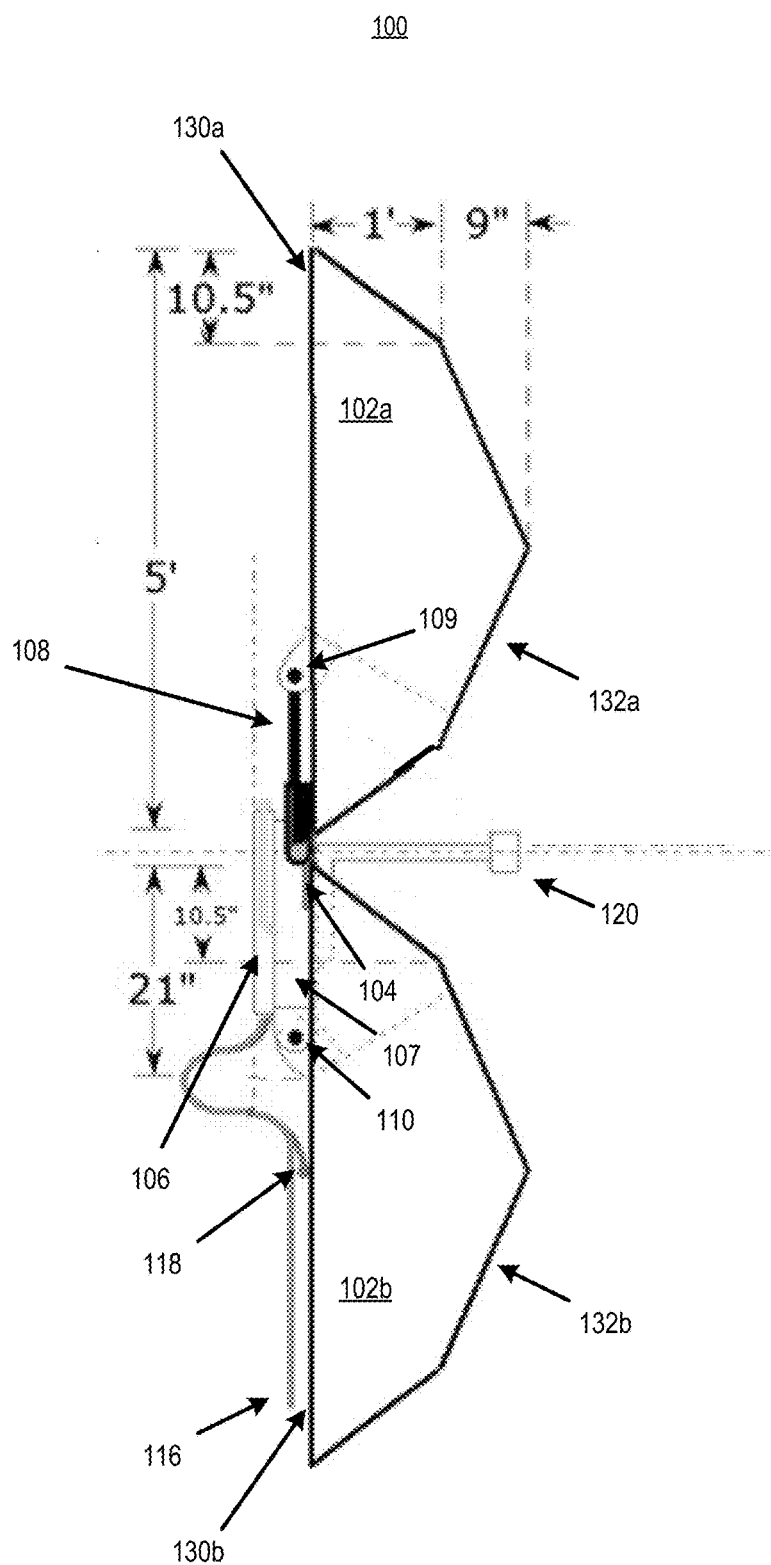
FIG. 1B is a side view of an exemplary floating variable leverage pump, in accordance with some embodiments.
Figure 2:
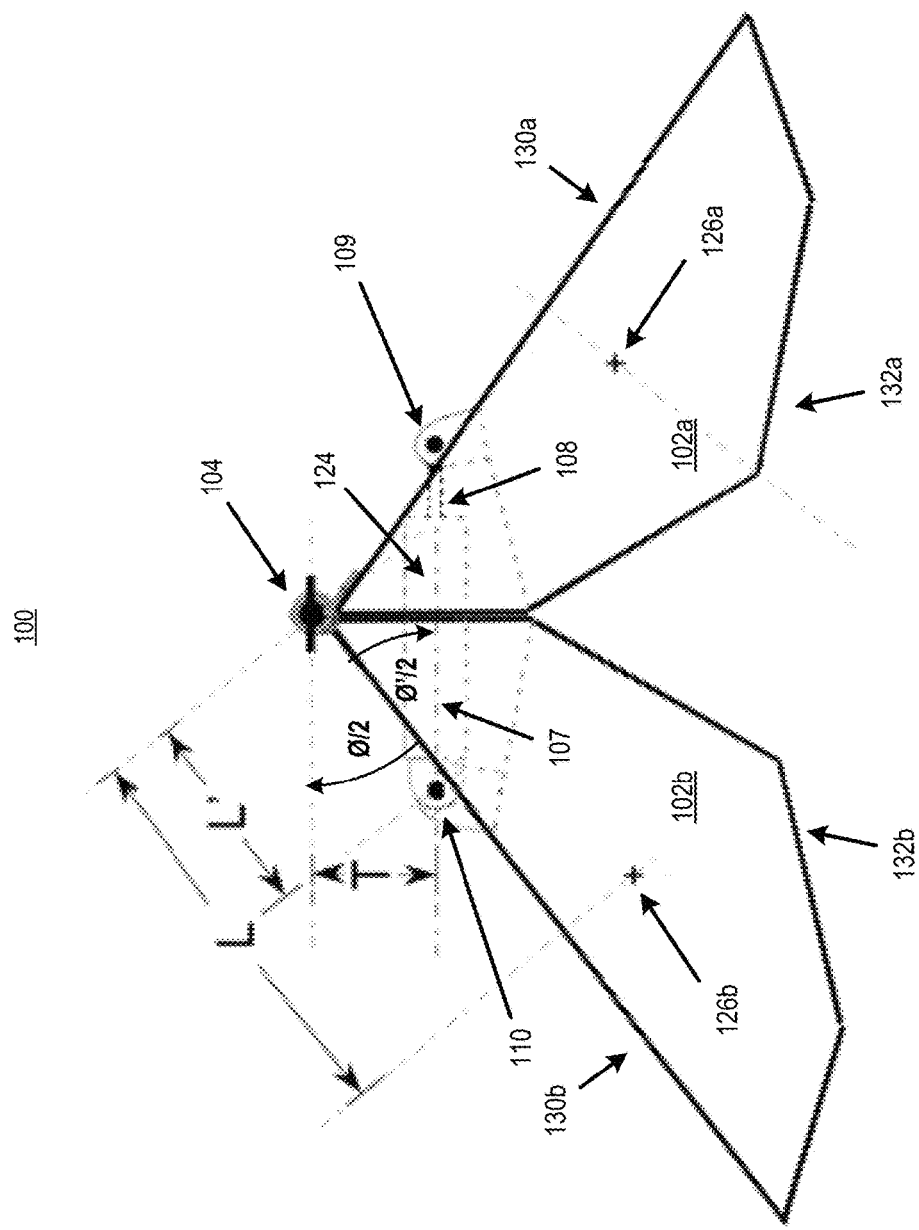
FIG. 2 is side view of an exemplary floating variable leverage pump having a maximum displacement position, in accordance with some embodiments.

Referring to FIGS. 1A and 1B, top and side views of an exemplary floating variable leverage pump 100 are illustrated, respectively. While FIGS. 1A and 1B show exemplary dimensions for the floating variable leverage pump 100, the exemplary dimensions may not be shown to scale and alternative dimensions may be used for the floating variable leverage pump 100 based on a desired configuration of the floating variable leverage pump 100. As described herein, the floating variable leverage pump 100 may include floating vessels 102, coupling mechanisms 104, a piston pump 105 including a pump housing 107 coupled to a piston rod 108, and a membrane housing 106. As illustrated in FIGS. 1A-1B and 2, the floating vessel 102a and the floating vessel 102b (collectively referred to herein as floating vessels 102) may be buoyant and configured to float on a body of water (e.g., ocean, lake, river, etc.). Each floating vessel 102 may include a top surface 130 and a bottom surface 132 opposite the top surface 130. For example, the floating vessel 102a may include a top surface 130a and a bottom surface 132a and the floating vessel 102b may include a top surface 130b and a bottom surface 132b. In some cases, when a floating vessel 102 is positioned (e.g., floating) on a body of water, the top surface 130 of each floating vessel 102 may be positioned above a water line of the body of water, while the bottom surface 132 may be positioned (e.g., submerged) at least partially below the water line of the body of water. The floating vessels 102 may include and/or be comprised of a buoyant material such as a fiberglass material (e.g., a low mass fiberglass material). In some cases, as shown by the side view of the floating variable leverage pump 100 illustrated in FIG. 1B, each of the floating vessels 102 may have a "tippy-boat" cross-section. Any suitable shape may be used for the floating vessels 102. In some cases, as shown in FIGS. 1A and 1B, each floating vessel 102 may have a width of approximately 8 feet, a length of approximately 5 feet, and a height of approximately 1 foot 9 inches. In some cases, the floating vessels 102 may each have the same composition (e.g., dimensions, materials, etc.).

In some embodiments, the floating vessels 102 may be pivotally connected by coupling mechanisms 104a, 104b, 104c, and 104d (collectively referred to herein as coupling mechanisms 104). In some cases, as illustrated in FIGS. 1A and 1B, the coupling mechanisms 104 may be hinges configured to provide pivotal coupling. While the floating variable leverage pump 100 is shown and described as including four coupling mechanisms 104, any suitable number of coupling mechanisms 104 may be used. Examples of other pivotal coupling mechanisms 104 that may be used in the floating variable leverage pump can include rings, hooks, pins, and/or rods. Each of the coupling mechanisms 104 may enable each of the floating vessels 102 to oscillate independently in an arc centered along an axis 150 corresponding to the rotation of the coupling mechanisms 104, such that the floating vessels 102 can be displaced inward and outward relative to the coplanar position. As an example, each coupling mechanism 104 may be a cutlass type hinge including 1.25 inch hinge pins. In some cases, each coupling mechanism 104 may be comprised of steel.

In some cases, the floating vessels 102 may include one or more mooring rings 112. For example, as shown in FIG. 1A, the floating vessel 102b may include a mooring ring 112a and a mooring ring 112b (collectively referred to herein as mooring rings 112). The mooring rings 112 may enable mooring of the floating variable leverage pump 100 to an anchor and/or any other stationary device to maintain a position of the floating variable leverage pump 100 on a body of water.

In some embodiments, the floating variable leverage pump 100 may include a desalination system including the piston pump 105 (e.g., including the pump housing 107 and the piston rod 108) and the membrane housing 106. The piston pump 105 may be coupled to each of the floating vessels 102 in an area between each of the floating vessels 102, where the piston pump 105 may be coupled to the floating vessels 102 normal to the axis 150 of the coupling mechanisms 104. The area may be formed by rectangular voids included in each floating vessel 102. In some cases, as shown in FIGS. 1A and 1B, each rectangular void of a respective floating vessel 102 in which the piston pump 105 is disposed may have a width of approximately 1 foot and a length of approximately 21 inches, such that the combination of the rectangular voids of the pair of floating vessels 102 of the floating variable leverage pump 100 forms an area having a length of approximately 42 inches and a width of approximately 1 foot. The piston pump 105 may be equally spaced between the floating vessels 102.

In some embodiments, as described herein, the piston pump 105 may include the pump housing 107 and the piston rod 108, where the piston rod 108 is configured to actuate into and out of the pump housing 107. The pump housing 107 may include and/or be comprised of a stainless steel and/or monel alloy material. As an example, the piston pump 105 and the included pump housing 107 and piston rod 108 may be manufactured by Spectra Watermakers, Inc.

In some embodiments, a first end of the pump housing 107 may be coupled (e.g., rotationally coupled) to the floating vessel 102b by a force coupling, which may function as a fulcrum of the pump housing 107 (referred to as a "pump fulcrum 110"). A first end of the piston rod 108 may be coupled (e.g., rotationally coupled) to the floating vessel 102a by a force coupling, which may function as a fulcrum of the piston rod 108 (referred to as a "piston fulcrum 109"). The pump housing 107 may rotate about the pump fulcrum 110 and the piston rod 108 may rotate about the piston fulcrum 109 via the respective force couplings. In some cases, the force couplings may be cutlass type force couplings. In some cases, based on the piston pump 105 being equally spaced between the floating vessels 102, a midpoint between the piston fulcrum 109 and the pump fulcrum 110 may be equivalent to a midpoint of the piston pump 105.

In some embodiments, a second end of the piston rod 108 may be coupled to the pump housing 107 and may be configured to actuate into and out of the pump housing 107 based on the displacement of each of the floating vessels 102, thereby generating pressure within the piston pump 105. In some cases, the piston pump 105 may be a single action piston pump, such that the piston pump 105 may only generate pressure within the pump housing 107 when the piston rod 108 actuates into the pump housing 107 (e.g., during displacement of the floating vessels 102 from a coplanar position). The pump housing 107 may be coupled (e.g., fluidically coupled) to the membrane housing 106 by a fluid coupling mechanism 122 (e.g., hose, pipe, etc.). The membrane housing 106 may be configured to receive water pumped from the pump housing 107 by the piston rod 108. The membrane housing 106 may include a reverse osmosis membrane configured to filter water that is pressurized to permeate through the reverse osmosis membrane. An example of a reverse osmosis membrane used with the floating variable leverage pump 100 may be a Model M-S2521A membrane manufactured by Applied Membranes, Inc. The reverse osmosis membrane may have a threshold pressure level at which water may permeate through the membrane, such that water may only permeate through a first side of the membrane to a second side of the membrane when a pressure of the water on the first side of the membrane meets or exceeds the threshold pressure level. As an example, the threshold pressure level of the membrane may be 800 PSI, such that water may permeate through a first side of the membrane to a second side of the membrane when the water is applied to the first side of the membrane at a minimum pressure of approximately 800 PSI.

In some embodiments, the pump housing 107 may include a cavity (e.g., a bladder) configured to fill with and store water (e.g., water collected from a body of water on which the floating variable leverage pump 100 floats). As shown in FIG. 1B, the pump housing 107 may include and/or be coupled to a fluid intake 120 configured to receive water from a body of water on which the floating variable leverage pump 100 floats. The fluid intake 120 may be a tube or pipe that extends downward from the pump housing 107 toward the body of water and may have a height equivalent to or greater than a height of the floating vessels 102. As an example, the fluid intake 120 may have a height of 1 foot 9 inches. The cavity of the pump housing 107 may be fluidically coupled to the membrane housing 106 by a fluid coupling mechanism 122. Actuation of the piston rod 108 out of the pump housing 107 may cause the piston pump 105 to pump water into the cavity of the pump housing 107 via the fluid intake 120. Based on pumping water into the cavity of the pump housing 107, actuation of the piston rod 108 into the pump housing 107 may (i) pressurize a the water stored in the cavity of the pump housing 107 and (ii) pump the water into a cavity (e.g., bladder) of the membrane housing 106 via a fluid coupling mechanism 122. Further, actuation of the piston rod 108 into the pump housing 107 may cause the water pumped into the cavity of the membrane housing 106 to exceed a threshold pressure level and permeate through a first side of the reverse osmosis membrane included in the membrane housing 106. The water may permeate through a first side of the reverse osmosis membrane and exit a second side of the reverse osmosis membrane. In some cases, only a first portion of the water stored in the cavity of the membrane housing 106 may permeate through the reverse osmosis membrane, which may be referred to herein as "product water". A second portion of the water stored in the cavity of the membrane housing 106 that is unable to permeate through the reverse osmosis membrane may be referred to as "brine".

Figure 3:
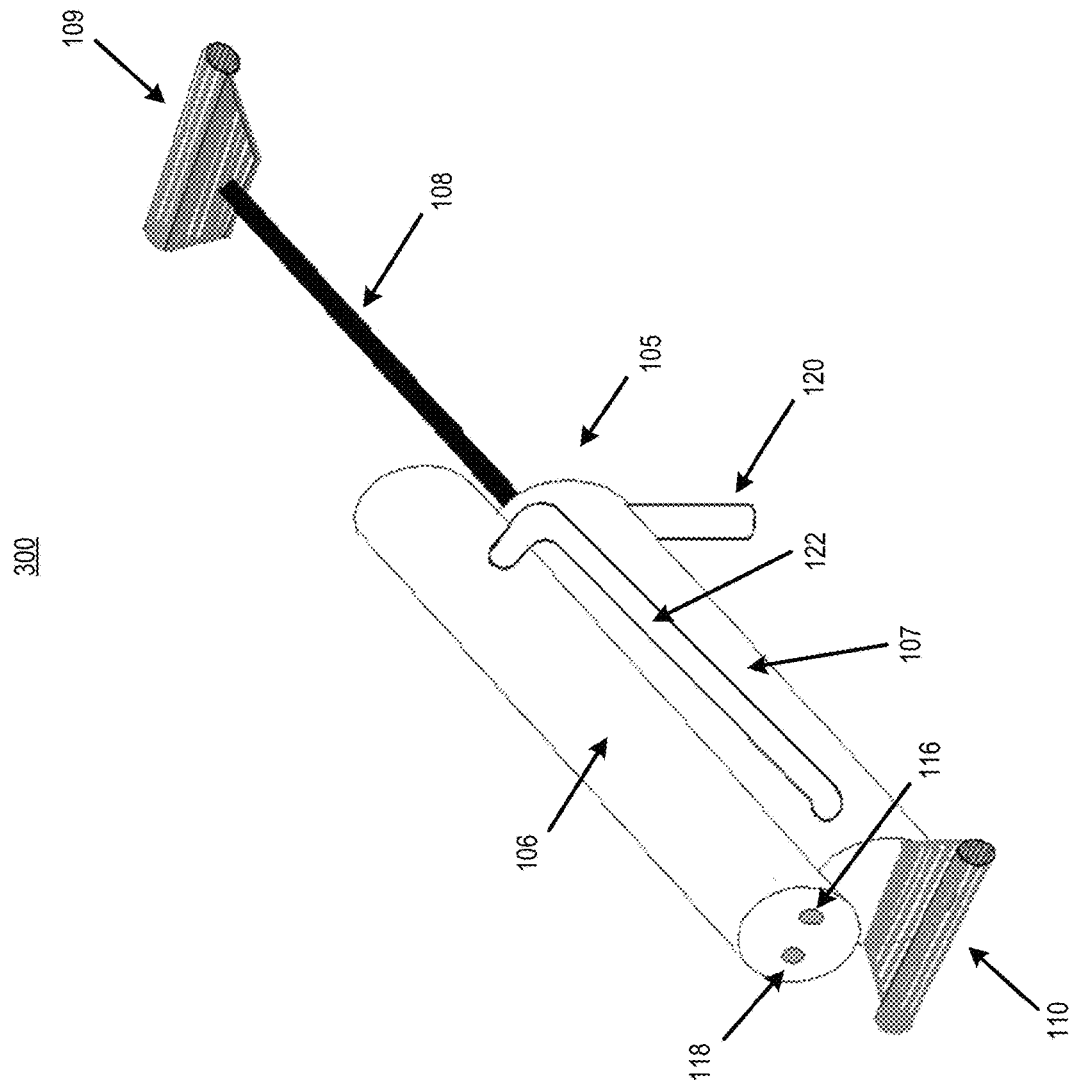
FIG. 3 is a top perspective view of an exemplary desalination system included in an exemplary floating variable leverage pump, in accordance with some embodiments.

In some embodiments, the cavity of the membrane housing 106 may be coupled to a first side of the reverse osmosis membrane included in the membrane housing 106. A brine output 118 may be coupled to the cavity of the membrane housing 106. A product water output 116 may be coupled to a second side of the reverse osmosis membrane included in the membrane housing 106, where product water permeates from the first side of the reverse osmosis membrane through to the second side of the reverse osmosis membrane. As shown in FIGS. 1A, 1B, and 3, the brine output 118 may be configured to discharge the brine from the cavity of the membrane housing 106 to areas at each of the coupling mechanisms 104 (e.g., via a hose connected to the brine output 118). Alternative configurations of the brine output 118 may be used with the floating variable leverage pump 100. When the cavity of the pump housing 107 is empty and not filled with water, actuation of the piston rod 108 out of the pump housing 107 may cause the fluid intake 120 to receive and pump (e.g., via a difference in pressure) water from the body of water into the pump housing 107. The pumped water may fill the cavity of the pump housing 107. When the cavity of the pump housing 107 is at least partially filled with water, actuating the piston rod 108 into the pump housing 107 (e.g., via displacement of the floating vessels 102 from the planar position) may (i) generate and apply a pressure to the water included in the cavity and (ii) pump the water into the cavity of the membrane housing 106. When a threshold amount of pressure (e.g., approximately 800 PSI) is applied to the water, the water may permeate through a first side of the reverse osmosis membrane of the membrane housing 106, thereby filtering and desalinating the water to produce product water as described herein.

In some embodiments, the threshold amount of pressure needed to cause the water to permeate through the first side of the reverse osmosis membrane may be based on (e.g., dependent on) a type of a reverse osmosis membrane used in the membrane housing 106. The product water may exit a second side of the reverse osmosis membrane through the product water output 116. The product water output 116 may be coupled to a storage tank and/or any suitable vessel configured to receive the product water. A brine including substances that are not permeable through the reverse osmosis membrane may exit the cavity through the brine output 118.

In some embodiments, when the floating variable leverage pump 100 floats on a body of water, variable waves, tides, and/or currents may act on the floating vessels 102, thereby changing the positions of the floating vessels relative to the axis 150. Variable waves and related wave motion may act on the floating vessels 102 by a buoyancy force and an inertial force. Uneven buoyancy between each of the floating vessels 102 can cause the floating vessels 102 to oscillate about the axis 150 into a folded, displaced position (e.g., as shown in FIG. 2). Inertial forces of passing waves acting on the floating variable leverage pump 100 can cause further displacement of the floating vessels 102, thereby applying a horizontal force on the piston rod 108 at the piston fulcrum 109 via the respective force coupling, thereby actuating the piston rod 108 into and out of the pump housing 107. When the floating vessels 102 are coplanar with respect to each other, a mechanical advantage approaches infinity as motion on the piston rod 108 approaches zero. As the floating vessels 102 are deflected from the coplanar position, the mechanical advantage becomes proportionally less and motion on the piston rod 108 increases, until the floating vessels 102 reach maximum deflection (e.g., as shown in FIG. 2). In some cases, a distance between the piston fulcrum 109 and pump fulcrum 110 may be a maximum distance when the floating vessels 102 are in a coplanar position. In some cases, a distance between the piston fulcrum 109 and pump fulcrum 110 may be a minimum distance when the floating vessels 102 when the floating vessels 102 reach maximum displacement from the coplanar position (e.g., as shown in FIG. 2). The distance between the piston fulcrum 109 and pump fulcrum 110 may vary between the minimum distance and the maximum distance based on the oscillation of the floating vessels about the axis 150 (e.g., based on wave motion from a body of water on which the floating variable leverage pump 100 is positioned).

As described herein, variable waves may cause the floating vessels 102 to oscillate about the axis 150 via the coupling mechanisms 104, thereby causing displacement of the floating vessels 102 away from and toward a coplanar position. Displacing the floating vessels 102 away from a coplanar position may cause actuation of the piston pump 105, such that the piston rod 108 actuates into and out of the pump housing 107. In some cases, displacing the floating vessels 102 toward (e.g., closer to) a coplanar position may cause actuation of the piston pump 105, such that the piston rod 108 actuates out of the pump housing 107. In some cases, displacing the floating vessels 102 away from a coplanar position may cause actuation of the piston pump 105, such that the piston rod 108 actuates into the pump housing 107. Variable waves as described herein may refer to waves of a varying amplitude and/or a varying period. While forces from waves may act on the floating variable leverage pump 100 as describe herein to displace the floating vessels 102, any particular forces originating from a body of water on which the floating variable leverage pump 100 floats may act on and displace the floating vessels. For example, forces from tides and/or currents may act on the floating vessels 102.

FIG. 2 is an illustration of an exemplary floating variable leverage pump 100 comprising a maximum, outward displacement position from a coplanar position (e.g., as shown in FIG. 1B). While FIG. 2 illustrates the floating vessels 102 as having a maximum outward displacement position where the top surfaces of the floating vessels 102 are directed away from the axis 150, the floating vessels 102 may be displaced inward from the coplanar position and may have a maximum inward displacement position where the top surfaces of the floating vessels 102 are directed toward the axis 150. In some embodiments, with respect to FIG. 2, a geometric center of an floating vessel 102 may be referred to as a center of effort 126 of the floating vessel 102. The floating vessels 102a and 102b may have respective a center of effort 126a and a center of effort 126b, respectively. As shown in FIG. 2, the length between the axis 150 and the center of effort 126 of a floating vessel 102 may be referred to as "L". The length between the axis 150 and centers of each of the fulcrums 109 and 110 may be referred to as "L'" and an "eccentric distance" as described herein. The vertical distance (e.g., the fulcrum offset) between the axis 150 and each of the force couplings corresponding to the fulcrums 109 and 110 may be referred to as "T", which may be a variable load arm that can act on the floating vessel 102. In some cases, Equation 1 may define the variable load arm as:

$$T = \cot(\emptyset')L' \qquad (1)$$

In some cases, the piston pump 105 may have an axis 124 that corresponds to (e.g., colinear with) a length of the piston pump 105 that is perpendicular to the axis 150. As shown in FIG. 2, the angle $\emptyset'/2$ may be an angle between the axis 124 of the piston pump 105 and a top surface (e.g., deck) of a floating vessel 102. The angle $\emptyset'$ may be the sum of the angles between the axis 124 corresponding to a length of the piston pump 105 and the top surfaces (e.g., decks) of the floating vessels 102a and 102b. As an example, the angle $\emptyset'$ may be (i) 0° when the floating vessels 102a and 102b are coplanar and the fulcrums 109 and 110 are at a maximum distance and (ii) a maximum or minimum angle when the fulcrums 109 and 110 are at a minimum distance. As shown in FIG. 2, the angle $\emptyset/2$ may be an angle of deflection of a floating vessel 102 from a coplanar position. The angle $\emptyset$ may be the sum of the angles of deflection of the floating vessels 102a and 102b from a coplanar position. As an example, the angle $\emptyset$ may be (i) 0° when the floating vessels 102a and 102b are coplanar and the fulcrums 109 and 110 are at a maximum distance and (ii) a maximum or minimum angle when the fulcrums 109 and 110 are at a minimum distance. In some cases, the angles $\emptyset'/2$ and $\emptyset/2$ may assume that the floating vessels 102 each have the same angular displacement. The leverage at each of the force couplings corresponding to the fulcrums 109 and 110 may be defined by Equation 2 as:

$$\text{Leverage} = \frac{L/L\prime}{T} \qquad (2)$$

The leverage defined by Equation 2 may correspond to a leverage on the piston pump 105. In some embodiments, the greater the deflection of the floating vessels 102 from the coplanar position, the greater the force required to move the floating vessels 102 further away from the coplanar position. As an example, when the floating variable leverage pump 100 is positioned on a body of water, smaller, less forceful waves can actuate the piston rod 108 into the pump housing 107 with smaller deflections of the floating vessels 102 from the coplanar position, while larger, more forceful waves can actuate the piston rod 108 into the pump housing 107 with larger deflections of the floating vessels 102 from the coplanar position. Waves may deflect the floating vessels 102 further away from the coplanar position until an equilibrium is reached between a force of the wave, gravitational forces forcing the floating vessels 102 to a coplanar position, and a resistance of the piston pump 105. The forces of the body of water (e.g., waves), gravity, and the resistance of the piston pump 105 can form a system of automatic power matching. Based on the floating vessels 102 being deflected from the coplanar position, the buoyancy of the floating vessels 102 and gravitational forces can move and return the floating vessels 102 from a displaced position toward the coplanar position.

In some embodiments, as described herein, a floating variable leverage pump 100 may include a desalination system. FIG. 3 is a top perspective view of an exemplary desalination system 300 included in a floating variable leverage pump 100. As shown in FIG. 3, the desalination system 300 can include a piston pump 105 including a pump housing 107 and a piston rod 108 as described herein. The pump housing 107 may be fluidically coupled to the membrane housing 106 by a fluid coupling mechanism 122. As an example, the fluid coupling mechanism 122 may be a hose, pipe, or tube. The desalination system 300 may be rotationally coupled to the floating vessels 102 by the respective force couplings of the piston fulcrum 109 and the pump fulcrum 110. In some cases, the force couplings can be hinges. A cavity of the pump housing 107 may be configured to receive water via the fluid intake 120. A product water output 116 may be coupled to a second side of the reverse osmosis membrane included in the membrane housing 106. A brine output 118 may be coupled to the cavity of the membrane housing 106. While the above described desalination system 300 and included components have been described with respect to desalinating water to produce product water and a brine, the desalination system and/or the floating variable leverage pump 100 may be modified to filter (e.g., desalinate) and/or pump any particular fluid.

In some embodiments, a number of floating variable leverage pumps 100 may be connected in a system. As an example, a system may include a number of floating variable leverage pumps connected in series, such that the system includes a number of floating variable leverage pumps 100 each having a respective axis 150. As another example, a system may include a number of floating variable leverage pumps connected in parallel, such that the system includes a number of floating variable leverage pumps 100 that share a single axis 150.

In some embodiments, the floating variable leverage pump 100 as described herein may be manufactured with the connections, components, and/or dimensions as described herein. Further, in some cases, the floating variable leverage pump 100 may be manufactured using connections, components, and/or dimensions at least partially different from those described herein.

Control of a Period of Oscillation of a Floating Variable Leverage Pump

Figure 4:
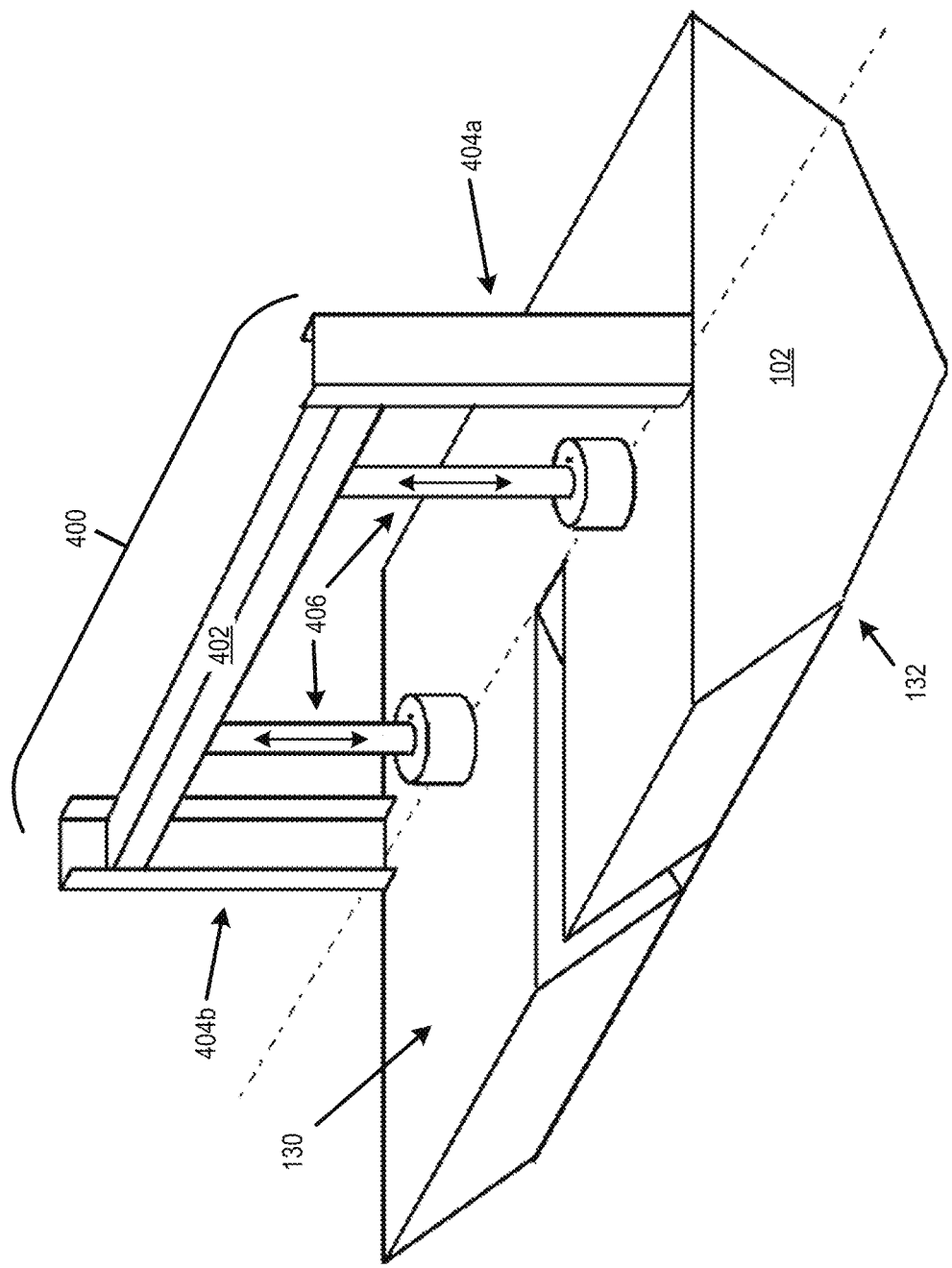
FIG. 4 is a top perspective view of an exemplary floating vessel of a floating vessel period (FVP) control mechanism, in accordance with some embodiments.

In some cases, the floating vessels 102 and/or the coupling mechanisms 104 may include a control mechanism configured to enable adjustment of a period of oscillation of the floating vessels 102 of the floating variable leverage pump 100. Such a control mechanism may be referred to herein as a floating vessel period (FVP) control mechanism. FIG. 4 is a top perspective view of an exemplary floating vessel 102 of a floating variable leverage pump (e.g., floating variable leverage pump 100) including a floating vessel period (FVP) control mechanism 400. The FVP control mechanism 400 may be oriented parallel to the axis 150. The FVP control mechanism 400 may include one or more pendulum weights 402, one or more pendulum guides 404, and one or more hydraulic actuators 406. In the example of the FVP control mechanism 400 shown in FIG. 4, the FVP control mechanism 400 includes one pendulum weight 402, a pair of pendulum guides 404a and 404b (collectively referred to herein as "pendulum guides 404"), and a pair of hydraulic actuators 406a and 406b (collectively referred to herein as "hydraulic actuators 406"), where the pendulum weight 402 is positioned (i) parallel to the axis 150 and (ii) parallel to a width of the floating vessel 102 to evenly distribute the weight of the pendulum weight 402. The FVP control mechanism 400 may be coupled to and extend upward from a top surface 130 (also referred to as a "deck 130") of a floating vessel 102. In some cases, the floating vessels 102a and 102b of the floating variable leverage pump 100 may each include an FVP control mechanism 400. A bottom surface of the floating vessel 102 positioned opposite the top surface 130 may be positioned on a body of water during operation of the floating vessel 102 and the floating variable leverage pump.

In some embodiments, the period of oscillation of the floating vessel 102 (e.g., as included in the floating variable leverage pump 100) can be modified by adjusting a metacentric height of the floating vessel 102, where a height of the pendulum weight 402 included in the FVP control mechanism 400 can control the metacentric height of the floating vessel 102. The pendulum weight 402 may include one or more masses (e.g., cylindrical masses, spherical masses, rectangular masses, etc.) that can be raised and lowered relative to the top surface 130 of the floating vessel 102 by the hydraulic actuators 406. In some cases, the period of oscillation of the floating vessel 102 may be based on (e.g., correlated with) the height of the pendulum weight 402. As an example, raising the pendulum weight 402 away from the top surface 130 of the floating vessel 102 from a first height to a second height may increase a period of oscillation of the floating vessel 102, such that the floating vessel 102 may oscillate and be displaced inward or outward further from the coplanar position. As another example, lowering the pendulum weight 402 closer to the top surface 130 of the floating vessel 102 from the second height to the first height may reduce a period of oscillation of the floating vessel 102, such that the floating vessel 102 may oscillate and be displaced inward or outward closer to the coplanar position. The FVP control mechanism 400 and the included pendulum weight 402 may be positioned parallel to an axis (e.g., axis 150) of oscillation of the floating vessel 102. In the example shown in FIG. 4, the FVP control mechanism 400 and the included pendulum weight 402 may be positioned at a midpoint (e.g., midpoint between opposite sides) of the top surface 130 of the floating vessel 102. In some cases, the FVP control mechanism 400 and the included pendulum weight 402 may be positioned directly above a center of effort 126 of the floating vessel 102 when the floating vessel 102 is in a coplanar (e.g., horizontal) position. In some cases, alternative positionings of the FVP control mechanism 400 and the included pendulum weight 402 relative to the top surface 130 of the floating vessel 102 may be used.

In some embodiments, the pendulum guides 404 may each include a first end and a second end opposing the first end, where a first end of the pendulum guides 404 are coupled to the top surface 130 of the floating vessel 102. The pendulum guides 404 may be configured to guide and/or retain the pendulum weight 402 within the FVP control mechanism 400. The pendulum guides 404 may operate as support structures to retain the pendulum weight 402 in place along a direction of actuation of the hydraulic actuators 406 (e.g., as indicated by the direction indicators of the hydraulic actuators 406 in FIG. 4). In some cases, the hydraulic actuators 406 may each include a first end and a second end opposing the first end. In some cases, first ends of the hydraulic actuators 406 may be coupled to the pendulum weight 402. Second ends of the hydraulic actuators 406 may be configured to actuate into and out of the top surface 130 of the floating vessel 102, thereby controlling a height of the pendulum weight 402 relative to the top surface 130 of the floating vessel. The hydraulic actuators 406 may control the height of the pendulum weight 402 based on a control signal received from a controller (e.g., computer processing device) communicatively connected to the hydraulic actuators 406. The height of the hydraulic actuators 406 and the corresponding height of the pendulum weight 402 may be automatically adjusted as described further herein (e.g., with respect to FIG. 5).

Figure 5:
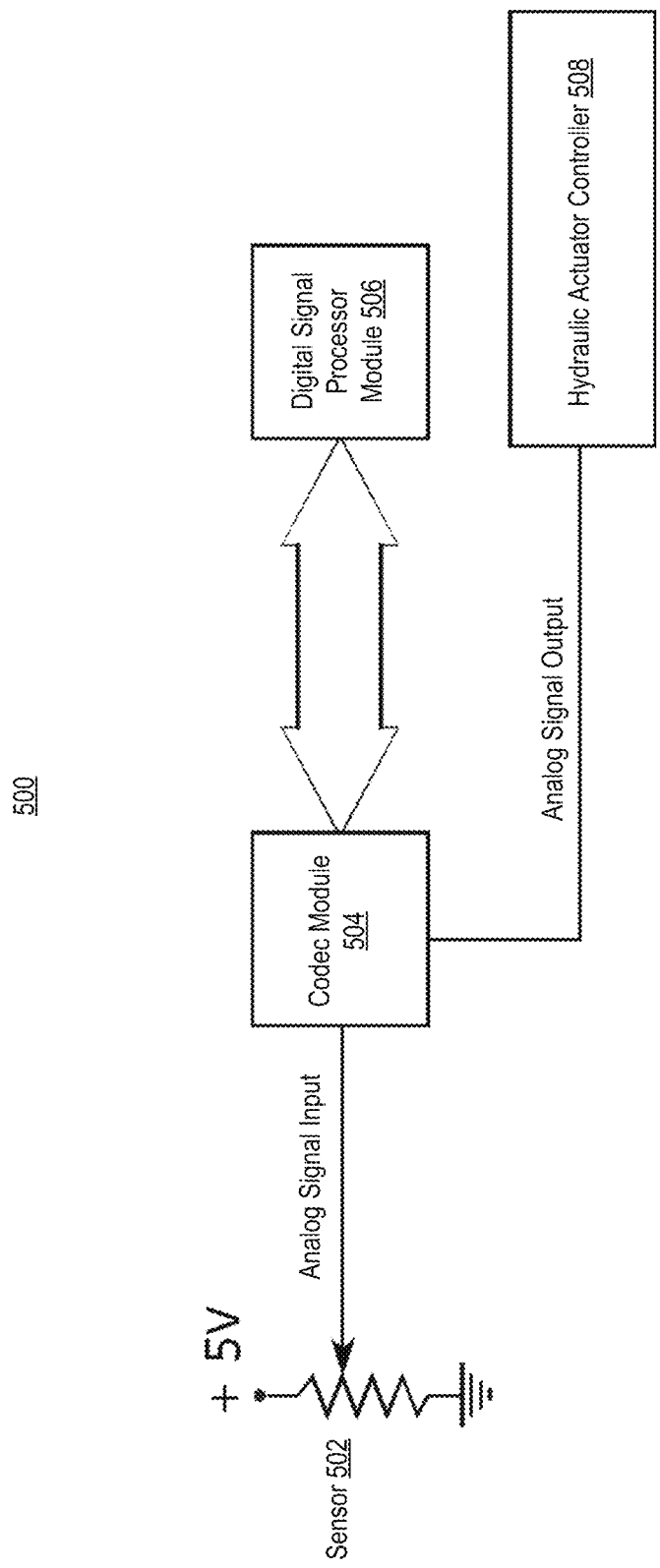
FIG. 5 is a block diagram of an exemplary controller of an FVP control mechanism, in accordance with some embodiments.

In some embodiments, using automatic control techniques, the period of oscillation of the floating vessels 102 may be automatically adjusted to correspond to (e.g., approximately match) a wave period of waves from a body of water on which the floating variable leverage pump 100 is positioned. The period of oscillation of the floating vessels 102 may be automatically adjusted via respective FVP control mechanisms 400 included in each of the floating vessels 102. Positions of the pendulum weights 402 included in each FVP control mechanism 400 may be automatically modified (e.g., raised or lowered) relative to the top surfaces 130 of the floating vessels 102 to adjust the period of oscillation of each of the floating vessels 102. A controller may be coupled to each of the hydraulic actuators 406 to automatically control and adjust or maintain the height of each pendulum weight 402 via actuation of the hydraulic actuators 406. FIG. 5 is a block diagram of an exemplary controller 500 of an FVP control mechanism. A floating variable leverage pump 100 and/or an individual floating vessel 102 may include the controller 500, where the controller 500 may control one or more FVP control mechanisms 400. In some cases, a respective controller 500 may independently control each FVP control mechanism 400 and the floating vessel 102 including the FVP control mechanism 400. The controller 500 may include a sensor 502, a codec module 504, a digital signal processor (DSP) module 506, and/or a hydraulic actuator controller 508. The controller 500 may be configured to control a position (e.g., height) of a pendulum weight 402 of an FVP control mechanism 400 based on a period of waves on which the floating vessel 102 is positioned, thereby controlling the period of oscillation of a floating vessel 102.

In some embodiments, the sensor 502 may be configured to actuate based on oscillation of a floating vessel 102 (e.g., based on waves acting on the floating vessel 102) to measure a wave period of waves acting on the floating vessel 102. The sensor 502 may be communicatively coupled to a codec module 504, where the codec module 504 may be configured to measure an output signal (e.g., an analog electrical signal) of the sensor 502 to determine output signal data. As an example, the sensor 502 may be a potentiometer. In some cases, when the sensor 502 is a potentiometer, the resistance of the potentiometer may vary over time based on a wave period of waves acting on the floating vessel 102. The codec module 504 may measure a resistance provided by the sensor 502 over time, where the resistance measured over time may indicate a wave period of waves acting on the floating vessel 102 during measurement of the resistance. The sensor 502 may provide an output signal (e.g., an analog electrical signal) to the codec module 504 and the codec module 504 may measure the output signal received from the sensor 502 over time to determine output signal data. The output signal data may be indicative of the period of the waves as described herein. While the sensor 502 is shown as a potentiometer supplied with a voltage of 5 volts (V), any suitable sensor and/or voltage may be used for the sensor 502 to measure a wave period of waves acting on the floating vessel and provide an output signal to the codec module 504.

In some embodiments, the codec module 504 may be communicatively coupled to both the DSP module 506 and the hydraulic actuator controller 508. The codec module 504 may be configured to convert an electrical signal received as an input and provide a converted electrical signal as an output. In some cases, the codec module 504 may receive an analog signal as an input, measure and convert the analog signal to digital signal data measured over time, and provide the converted digital signal data as an output. The codec module 504 may provide converted digital signal data to the DSP module 506. The codec module 504 may continuously and/or periodically measure an output signal provided by the sensor 502 to provide converted digital signal data to the DSP module 506. In some cases, the codec module 504 may aggregate an output signal provided by the sensor 502 over a period of time and may convert the aggregated output signal to provide converted digital signal data to the DSP module 506.

In some embodiments, the DSP module 506 may receive digital signal data from the codec module 504. The digital signal data may be indicative of a wave period of waves acting on the floating vessel 102 as described herein. Based on the digital signal data, the DSP module 506 may determine a wave amplitude and a wave period for waves acting on the floating vessels 102. In some cases, the DSP module 506 may determine a range of wave amplitudes and wave periods for waves acting on the floating vessels 102. To determine the wave amplitude and wave period, the DSP module 506 may process the digital signal data using one or more operations. As an example, the one or more operations may include application of Fast Fourier Transform (FFT) algorithms to the digital signal data to identify the strongest (e.g., best fit) wave amplitude and/or wave period (e.g., ranges of wave amplitude and/or wave period) from the digital signal data to determine a measured wave amplitude and/or wave period. Based on determining a measured wave amplitude and/or a measured wave period from the digital signal data, the DSP module 506 may provide a digital signal indicative of the measured wave amplitude and/or wave period to the codec module 504.

In some embodiments, the codec module 504 may receive the digital signal indicative of the measured wave amplitude and/or measured wave period from the DSP module 506. Based on receiving the digital signal indicative of the measured wave amplitude and/or measured wave period, the codec module 504 may convert the digital signal to an analog signal and may provide the analog signal to the hydraulic actuator controller 508.

In some embodiments, the hydraulic actuator controller 508 may be configured to control a height of a pendulum weight 402 via control of the height(s) of the hydraulic actuators 406 relative to a top surface of a floating vessel 102. The hydraulic actuator controller 508 may cause the hydraulic actuators 406 of any of the FVP control mechanisms 400 included in a floating variable leverage pump 100 to remain at a current position, raise from the current position, and/or lower from the current position. The hydraulic actuator controller 508 may cause adjustment of position(s) (e.g., height(s)) of the first ends of the hydraulic actuators 406. The hydraulic actuator controller 508 may control a hydraulic actuator 406 by a control signal sent by the hydraulic actuator controller 508 to a hydraulic actuator 406. The hydraulic actuator controller 508 may periodically or continuously determine to adjust or maintain a height of the hydraulic actuators 406 based on the analog signal received from the codec module 504.

In some embodiments, the hydraulic actuator controller 508 may determine a period of oscillation of the floating variable leverage pump 100 based on the height of the hydraulic actuators 406. In some cases, a period of oscillation of the floating variable leverage pump 100 may be based on the dimensions and weight of the floating variable leverage pump 100 and a configuration of FVP control mechanism 400. In some cases, the hydraulic actuator controller 508 may access a memory device storing a number of pre-determined periods of oscillation of the floating variable leverage pump 100 that each correspond to a respective height of the height of the hydraulic actuators 406. To determine the period of oscillation of the floating variable leverage pump 100, the hydraulic actuator controller 508 may identify the period of oscillation included in the number of pre-determined periods of oscillation that correspond to the known height of the hydraulic actuators 406.

In some embodiments, the hydraulic actuator controller 508 may receive the analog signal from the codec module 504. The analog signal may be indicative of the measured wave amplitude and/or measured wave period as described herein. Based on the analog signal, the hydraulic actuator controller 508 may determine to maintain or adjust a position of a hydraulic actuator 406 based on comparing the measured wave amplitude and/or measured wave period to the period of oscillation of the floating variable leverage pump 100. To maintain the position of a hydraulic actuator 406, the hydraulic actuator controller 508 may not send a control signal to the hydraulic actuator 406 or may maintain a control signal provided to the hydraulic actuator 406, such that the hydraulic actuator 406 remains at a current position. To adjust the position of a hydraulic actuator 406, the hydraulic actuator controller 508 may determine and provide a control signal to the hydraulic actuator 406, wherein the control signal is configured to cause the hydraulic actuator(s) 406 to raise or lower to a specified height and/or by a specified amount (e.g., step size). The control signal configured to maintain or adjust a position of a hydraulic actuator 406 may be determined by a control technique. Example control techniques used to determine the control signal provided to the hydraulic actuator(s) 406 can include iterative (e.g., closed-loop) control techniques configured to minimize a difference between a period of oscillation of a floating vessel 102 and a wave period of waves acting on the floating vessel 102 via comparison of the period of oscillation and the wave period. The control signal determined and provided by the hydraulic actuator controller 508 may cause automatic adjustment of the height of a pendulum weight 402 to tune the period of oscillation of a floating vessel 102 to resonate with a wave period of waves acting on the floating variable leverage pump 100.

Figure 6:
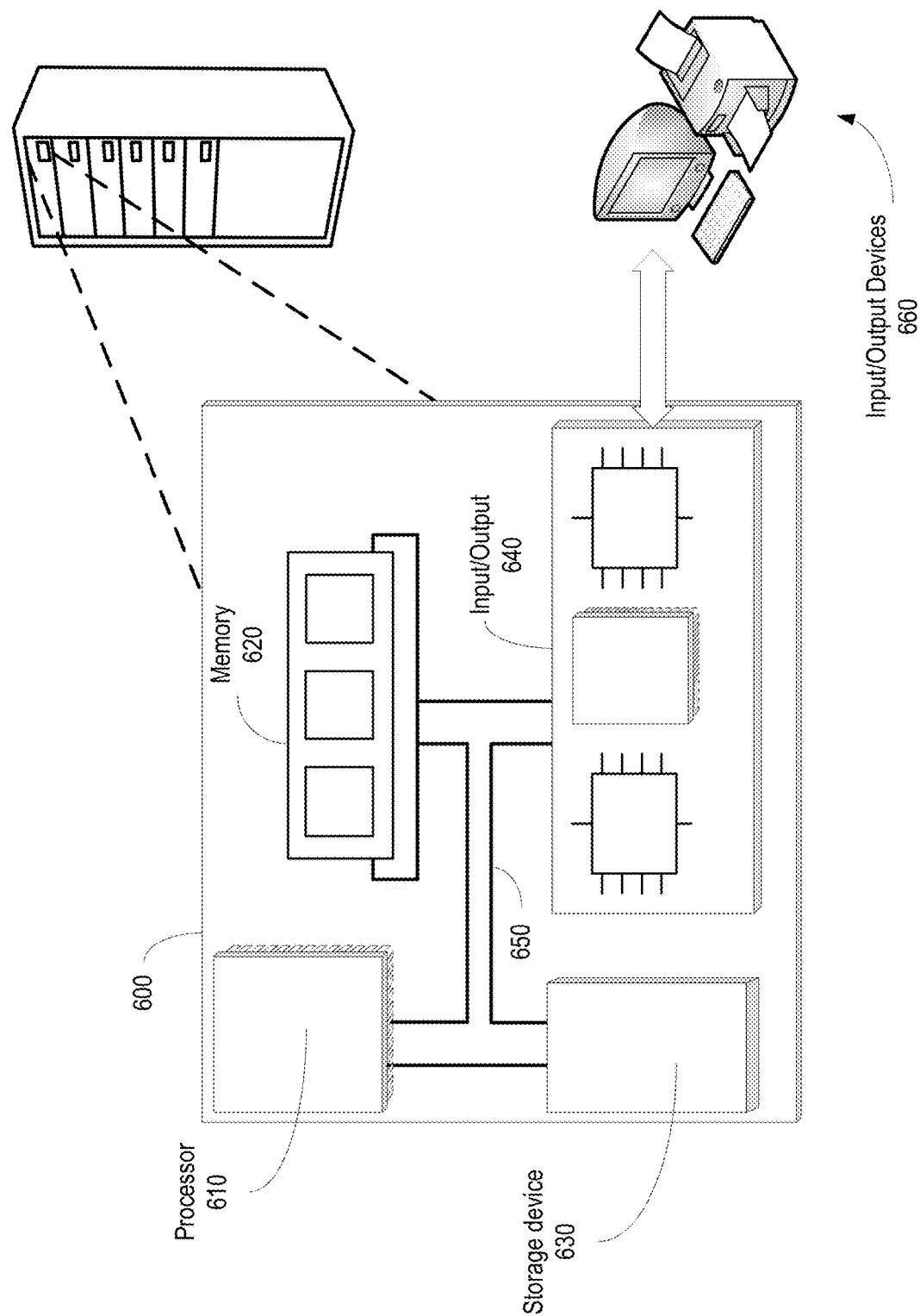
FIG. 6 is a block diagram of an example computer system, in accordance with some embodiments.

In some embodiments, the controller 500, any individual element of the controller 500, and/or any combination of elements of the controller 500 may be implemented by a computing system as described herein (e.g., with respect to FIG. 6).

Further Description of Some Embodiments

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, for example as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A floating variable leverage pump comprising:
   a first floating vessel;
   a second floating vessel, wherein the first floating vessel is pivotally coupled to the second floating vessel along an axis, wherein both the first floating vessel and the second floating vessel are configured to oscillate about the axis; and
   a pump device comprising:
     a first end pivotally coupled to a first fulcrum of the first floating vessel, and
     a second end pivotally coupled to a second fulcrum of the second floating vessel, wherein the pump device is positioned (i) perpendicular to the axis and (ii) in an area between the first floating vessel and the second floating vessel, and wherein at least one of the first floating vessel or the second floating vessel comprises a control mechanism configured to control a period of oscillation of the first floating vessel and the second floating vessel about the axis.

2. The floating variable leverage pump of claim 1, wherein the first floating vessel is pivotally coupled to the second floating vessel along the axis by one or more coupling mechanisms.

3. The floating variable leverage pump of claim 1, wherein the first floating vessel and the second floating vessel (i) comprise a buoyant material and (ii) are configured to float on a body of water.

4. The floating variable leverage pump of claim 1, wherein:
   the first end of the pump device comprises a piston rod,
   the second end of the pump device comprises a pump housing comprising a first cavity configured to store a fluid, wherein the piston rod is coupled to the pump housing, and
   oscillation of at least one of the first floating vessel or the second floating vessel about the axis is configured to cause the piston rod to actuate, thereby pressurizing the fluid.

5. The floating variable leverage pump of claim 4, further comprising an intake fluidically connected to the first cavity and configured to (i) receive the fluid and (ii) provide the fluid to the first cavity based on actuation of the piston rod.

6. The floating variable leverage pump of claim 4, further comprising a membrane housing comprising (i) a second cavity fluidically coupled to the first cavity by a fluid coupling mechanism and (ii) a reverse osmosis membrane, wherein the second cavity is fluidically coupled to a first side of the reverse osmosis membrane.

7. The floating variable leverage pump of claim 6, wherein the membrane housing further comprises (i) a first output fluidically coupled to the second cavity and (ii) a second output fluidically coupled to a second side of the reverse osmosis membrane.

8. The floating variable leverage pump of claim 7, wherein actuation of the piston rod into the pump housing is configured to cause (i) a first portion of the fluid to permeate from the first side of the reverse osmosis membrane through to the second side of the reverse osmosis membrane and (ii) a second portion of the fluid to exit through the first output.

9. The floating variable leverage pump of claim 1, wherein a distance between the first fulcrum and the second fulcrum is configured to vary from a minimum distance to a maximum distance based on (i) a position of the first floating vessel about the axis and (ii) a position of the second floating vessel about the axis.

10. The floating variable leverage pump of claim 9, wherein when the first floating vessel and the second floating vessel have a minimum displacement, the distance between the first fulcrum and the second fulcrum is the maximum distance.

11. The floating variable leverage pump of claim 10, wherein the first floating vessel and the second floating vessel have the minimum displacement when the first floating vessel and the second floating vessel are oriented in a same plane.

12. The floating variable leverage pump of claim 9, wherein when the first floating vessel and the second floating vessel have a maximum displacement, the distance between the first fulcrum and the second fulcrum is the minimum distance.

13. The floating variable leverage pump of claim 1, wherein the first floating vessel comprises a first void, wherein the second floating vessel comprises a second void, wherein the first void and the second void form the area.

14. The floating variable leverage pump of claim 1, wherein the control mechanism comprises:
   one or more weights;
   one or more guides configured to retain the one or more weights; and one or more actuators coupled to the one or more weights and configured to control a height of the one or more weights with respect to a top surface of the floating vessel, comprising the control mechanism, wherein the period of oscillation of the first floating vessel and the second floating vessel is based on the height of the one or more weights.

15. The floating variable leverage pump of claim 14, further comprising a computing device configured to perform operations comprising:

measuring a wave period of a body of water over a period of time;

comparing the wave period to the period of oscillation; and causing, based on the comparison, an adjustment to the height of the one or more weights via the one or more actuators.

16. The floating variable leverage pump of claim 14, wherein the control mechanism is (i) oriented in parallel with the axis and (ii) positioned at a midpoint between a first side of the top surface and a second side of the top surface opposite the first side of the top surface.

17. A method of assembling a floating variable leverage pump, the method comprising:

pivotally coupling a first floating vessel to a second floating vessel along an axis, wherein both the first floating vessel and the second floating vessel are configured to oscillate about the axis;

pivotally coupling a first end of a pump device to a first fulcrum of the first floating vessel; and pivotally coupling a second end of the pump device to a second fulcrum of the second floating vessel, wherein the pump device is positioned (i) perpendicular to the axis and (ii) in an area between the first floating vessel and the second floating vessel, and wherein at least one of the first floating vessel or the second floating vessel comprises a control mechanism configured to control a period of oscillation of the first floating vessel and the second floating vessel about the axis.

18. The method of claim 17, wherein the first floating vessel is pivotally coupled to the second floating vessel along the axis by one or more coupling mechanisms.

19. The method of claim 17, wherein the first floating vessel and the second floating vessel (i) comprise a buoyant material and (ii) are configured to float on a body of water.

* * * * *